(12) United States Patent
Carter et al.

(10) Patent No.: US 7,026,411 B1
(45) Date of Patent: Apr. 11, 2006

(54) VARIABLE TEMPERATURE CURABLE COMPOSITION

(75) Inventors: Jeffrey Thomas Carter, Middlesbrough (GB); Carmelo Lo Faro, Saltburn-by-the-Sea (GB)

(73) Assignee: Cytec Technology Corp., Wilmington, DE (US)

( * ) Notice: Subject to any disclaimer, the term of this patent is extended or adjusted under 35 U.S.C. 154(b) by 423 days.

(21) Appl. No.: 10/149,371

(22) PCT Filed: Nov. 6, 2000

(86) PCT No.: PCT/GB00/04243

§ 371 (c)(1),
(2), (4) Date: Jun. 5, 2002

(87) PCT Pub. No.: WO01/32779

PCT Pub. Date: May 10, 2001

(30) Foreign Application Priority Data

Nov. 4, 1999 (GB) ............................................. 9926032
Feb. 1, 2000 (GB) ............................................. 0002145

(51) Int. Cl.
*C08L 81/06* (2006.01)
*C08L 63/00* (2006.01)

(52) U.S. Cl. ........................ 525/403; 480/482; 480/452; 480/505; 480/535; 528/91; 528/391; 528/502 C

(58) Field of Classification Search ................ 525/403, 525/480, 482, 505, 452, 535; 528/391, 91, 528/502 C
See application file for complete search history.

(56) References Cited

FOREIGN PATENT DOCUMENTS

| EP | 311349 A2 | * | 4/1989 |
| EP | 365168 A2 | * | 4/1990 |
| EP | 486197 A2 | * | 5/1992 |

* cited by examiner

*Primary Examiner*—Margaret G. Moore
*Assistant Examiner*—Marc S. Zimmer

(57) ABSTRACT

Curable composition comprising at least one polyaromatic having reactive end groups, at least one thermoset resin, and a reactive catalyst, wherein the reactive end groups are adapted to react with the catalyst, characterized in that the catalyst comprises a Lewis acid having amine functionality, suitably the catalyst is of the formula: $LX_n.R$ where $LX_n$ is a Lewis acid and R is a amine; process for the preparation thereof; method for curing thereof; cured products and prepreg; and method for cure cycle design.

4 Claims, 9 Drawing Sheets

(5 of 9 Drawing Sheet(s) Filed in Color)

Figure 6 - MethylEthylKetone at 25C – X99 + 0.5 BF3(mea)
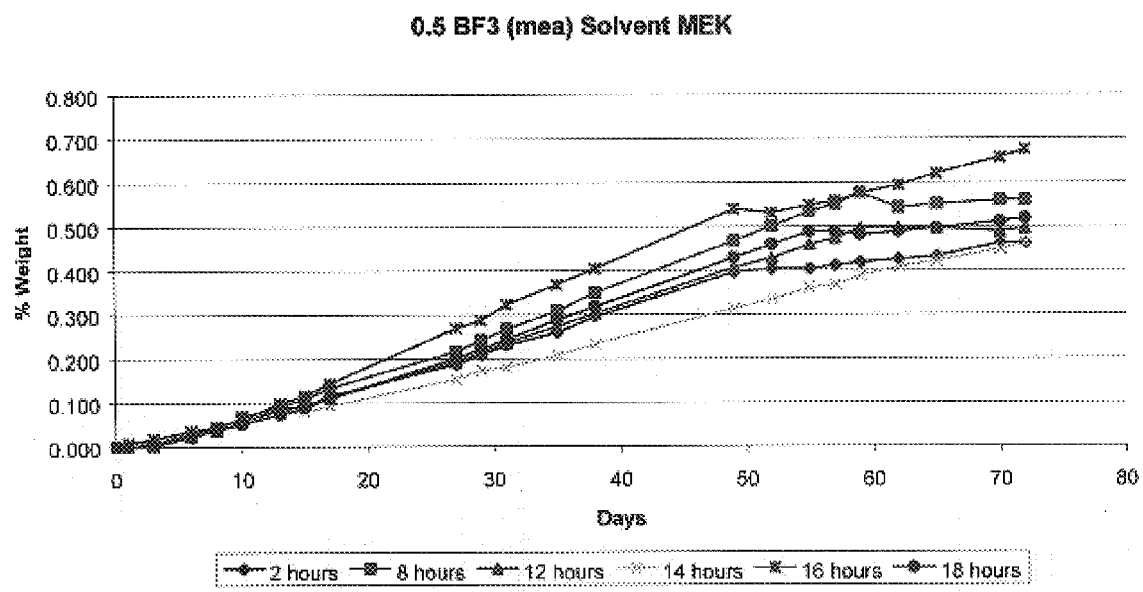
Figure 7
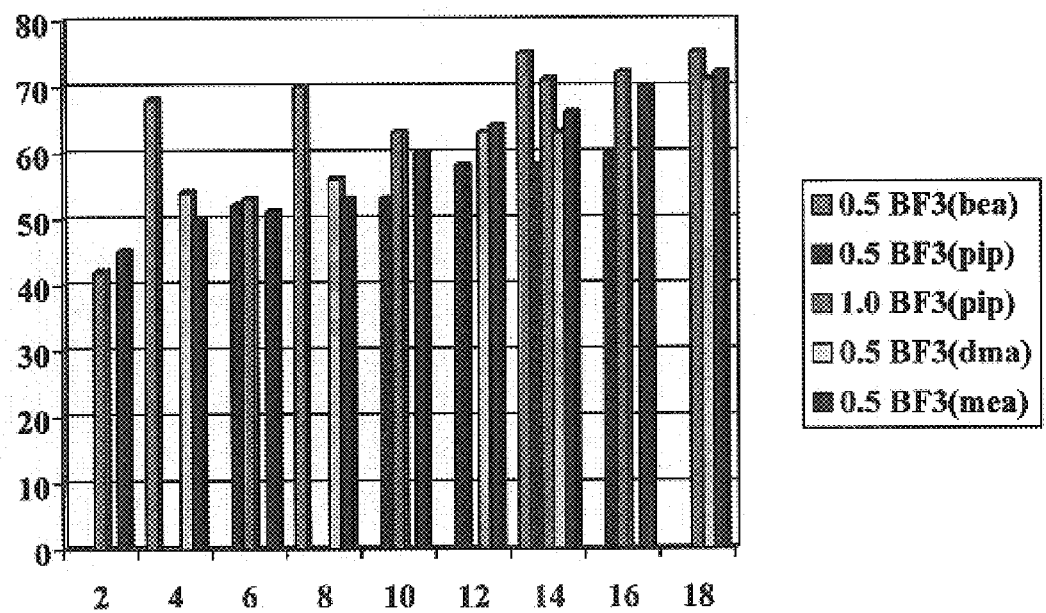

Figure 8
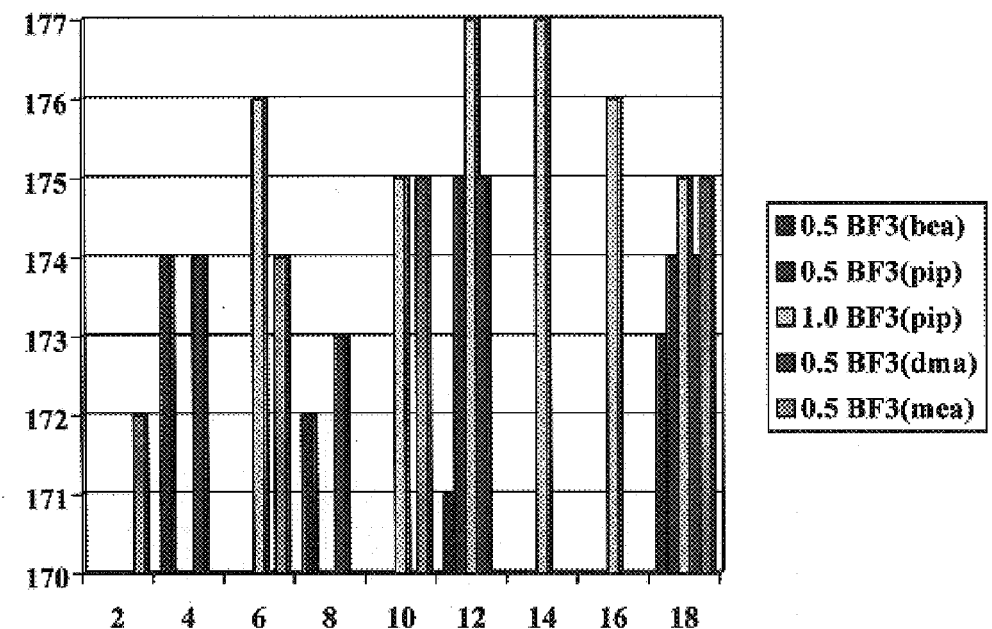
Figure 9 – Consumption of epoxide as a function of time at 85C.
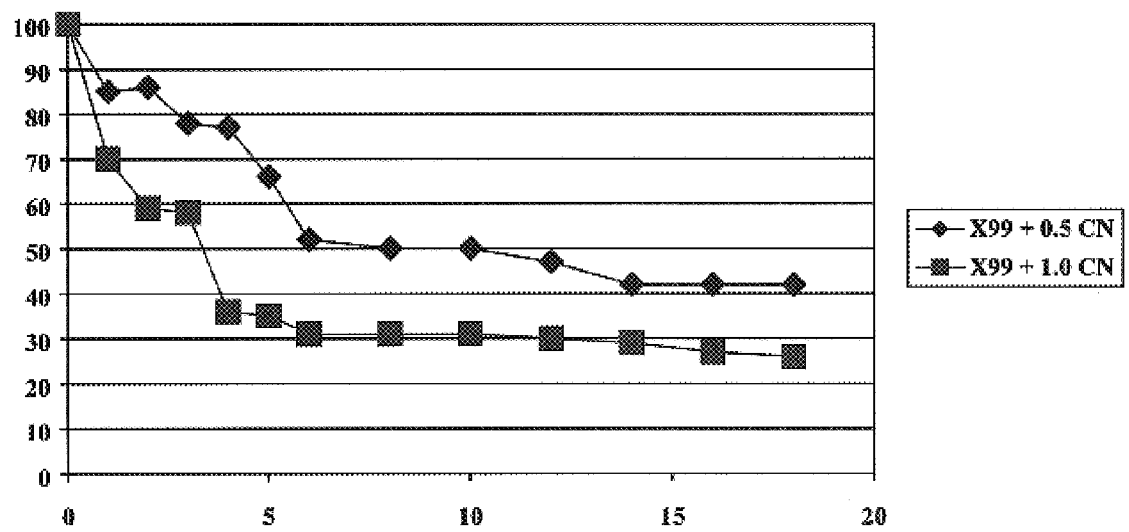

Figure 10 – Generation of Ether as a function of time at 85C.
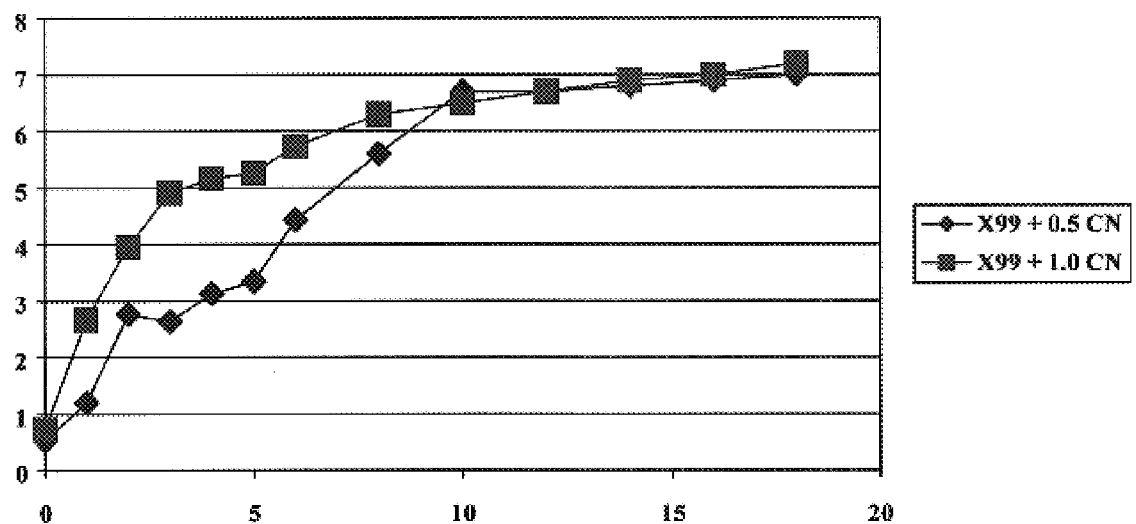
Figure 11 – Pre-cured Tg's as a function of time at 85C.
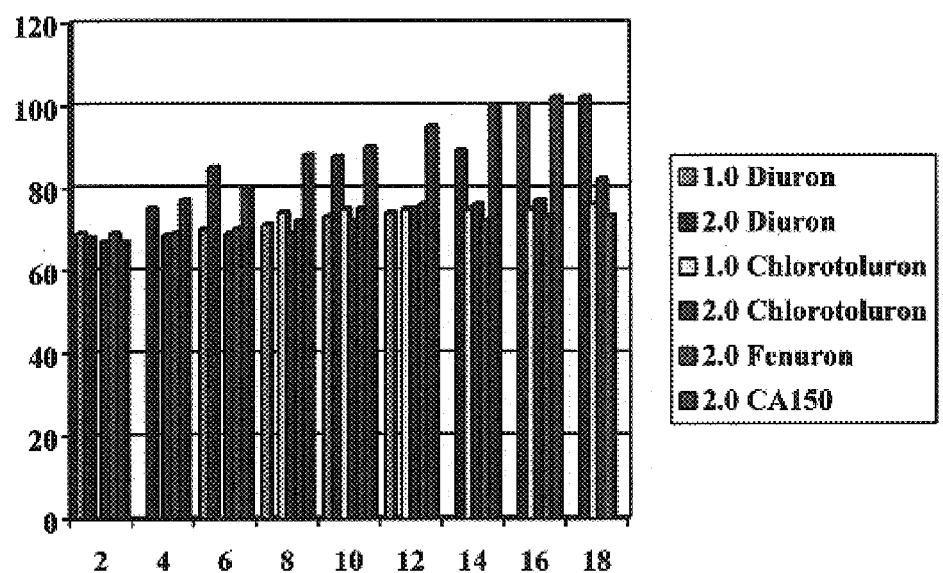

Figure 12 – postcured Tg's of the above pre-cured systems.
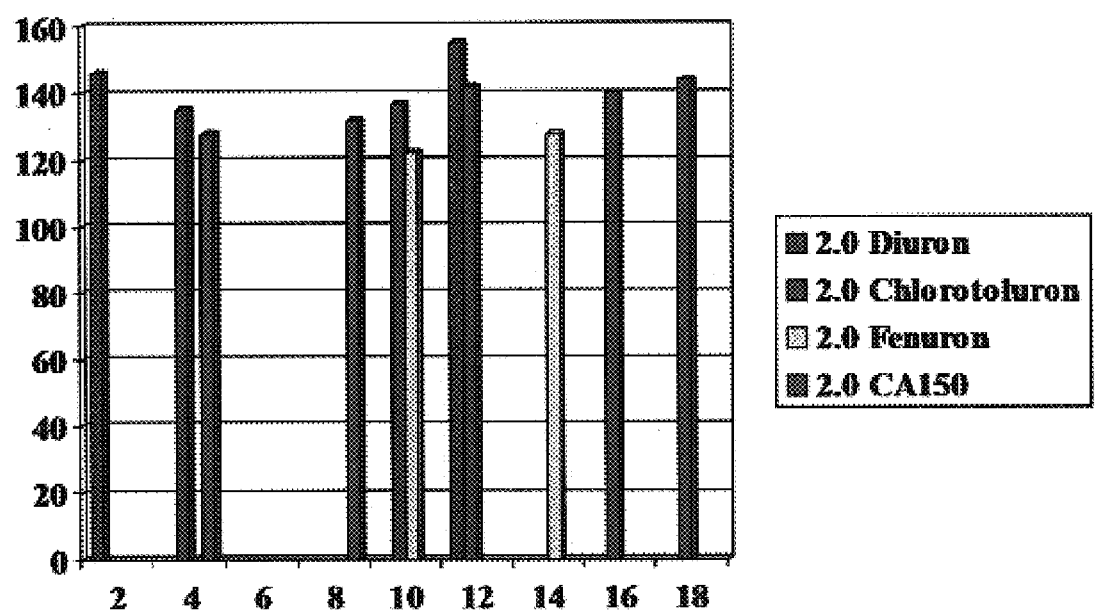

VARIABLE TEMPERATURE CURABLE COMPOSITION

The present invention relates to a variable temperature curable composition, the process for the preparation thereof, method for curing thereof, a cured neat resin, pre-preg, composite and shaped article, and a method for selecting a temperature time profile for curing a variable temperature curable composition. More particularly the present invention relates to a low temperature or rapid cure variable temperature curable resin composition comprising a reactive thermoplast resin and a reactive catalyst, the cured resin, pre-preg, composite, shaped product, and a process for the preparation, precuring and post curing thereof and a method for selecting a temperature time profile for curing a variable temperature curable composition.

For the production of engineering grade materials such as compoites and adhesives characterised by advanced mechanical properties, curable resin compositions comprising in combination a thermoplast and thermoset component are typically cured in an autoclave at elevated temperature and pressure for a sufficient period to allow reaction leading to an increase in molecular weight and glass transition temperature (Tg). The curing must be carried out for a sufficient period to allow these and other mechanical properties to develop.

There are two main opportunities in adopting low temperature curing (LTC) firstly the use of cheaper tooling materials which are light weight i.e. replacing steel with aluminium. This is possible because the LTC means that thermal expansion coefficient differences between the composite and aluminium are not as critical as at high temperature.

Secondly, closer dimensional tolerances are achievable which is very important in constructing high quality multi-component structures and matching component parts together avoiding strains but providing a good fit.

Low temperature curing however requires extended periods for curing. In cases in which curing is conducted in an autoclave, or in production of cured parts at high turnover rate, the extended periods required for curing may be unacceptable. In such case it may be simply a matter of increasing the cure temperature, but this is not possible in all cases or is not effective with some catalysts.

There remains a need for a thermoplast resin-containing composition which can be cured at low temperatures. A number of low temperature curing catalysts are useful in other systems, such as imidazole and urea based low temperature cure catalysts. However on testing these in the present composition, these were found to give inferior properties and did not sufficiently develop the glass transition temperature, even on extended post curing. There is also a need for a catalyst which is effective for rapid curing.

We have now surprisingly found that a thermoplast thermoset resin containing composition may be provided which is curable at variable temperatures and for variable cure periods and provides cured products having acceptable properties. The composition of the invention is curable for example at low temperature at which it has moreover surprisingly been found that the cured product displays comparable or superior properties in comparison with conventional cured compositions. It has moreover been found that the use of the low temperature cure in a novel process comprising a pre-cure and a post cure leads to further advantages in terms of processing and properties. We have moreover found that the use of a high temperature cure in a single stage leads to desired rapid cure and turnover.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 6 is graph showing Methyl Ethyl Ketone solvent uptake for X99+0.6BF3(mea) at 25° C. as a function of time.

FIG. 7 is graph showing the pre-cured Tg's of the Boron Triflouride catalysts used to cure X99 as a function of pre-cure time in hours.

FIG. 8 is graph showing the post-cure Tg's of the materials shown in FIG. 7.

FIG. 9 is graph showing the level of consumption of epoxide generated from the data in Table XI as a function of time at 85° C.

FIG. 10 is graph showing the level of ether generated from the data in Table XII as a function of time at 85° C.

FIG. 11 is graph showing the results for pre-cured Tg's as a function of time at 85° C.

FIG. 12 is graph showing the results for post-cured Tg's of the pre-cured materials shown in FIG. 11 as a function of time at 85° C.

Figure 1:
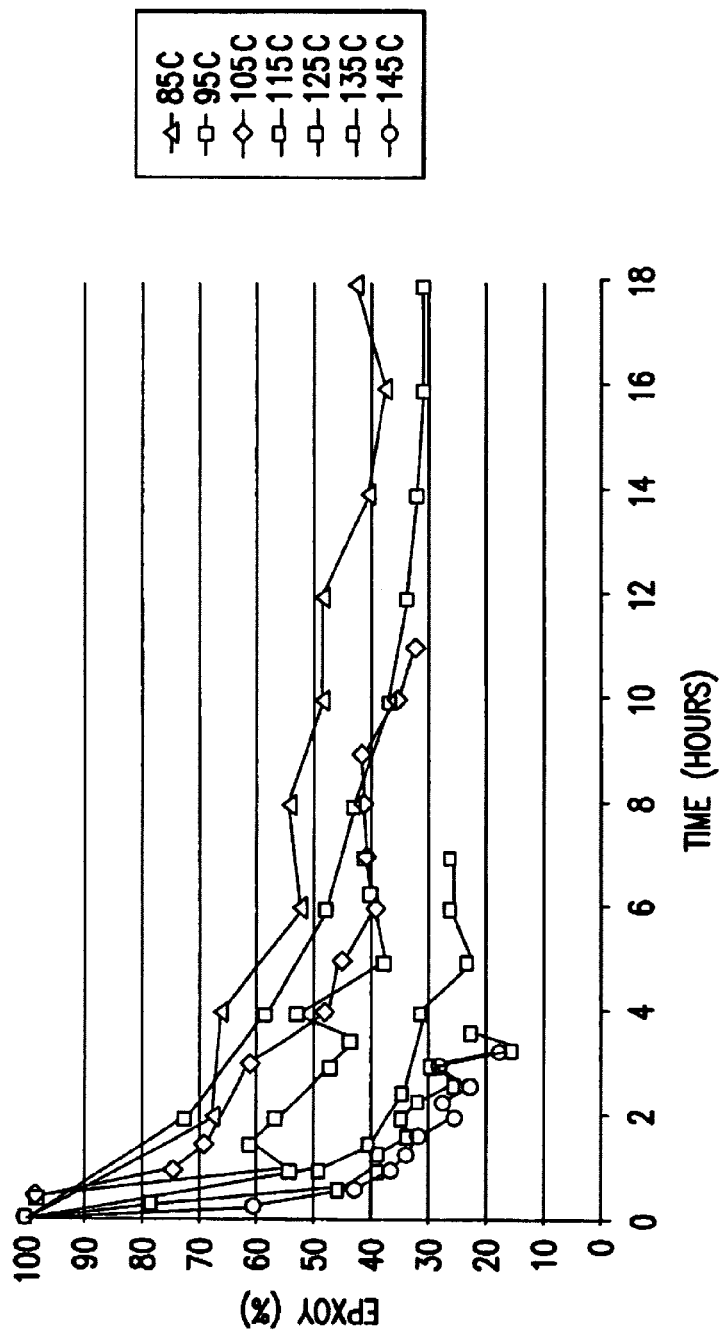
FIG. 1 is graph showing the consumption of epoxy for X99 cured at different temperatures as a function of time.
Figure 2:
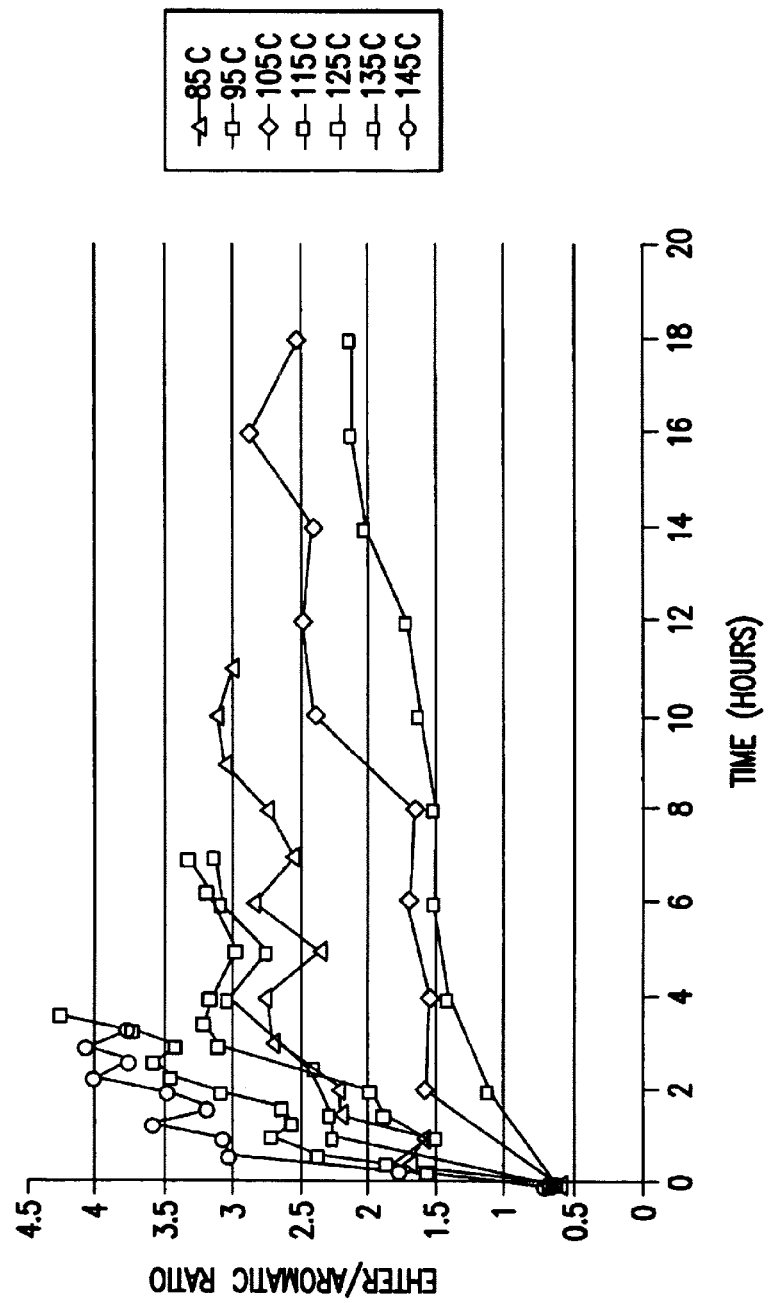
FIG. 2 is graph showing the development of ether linkages for X99cured at different temperatures as a function of time.
Figure 3A:
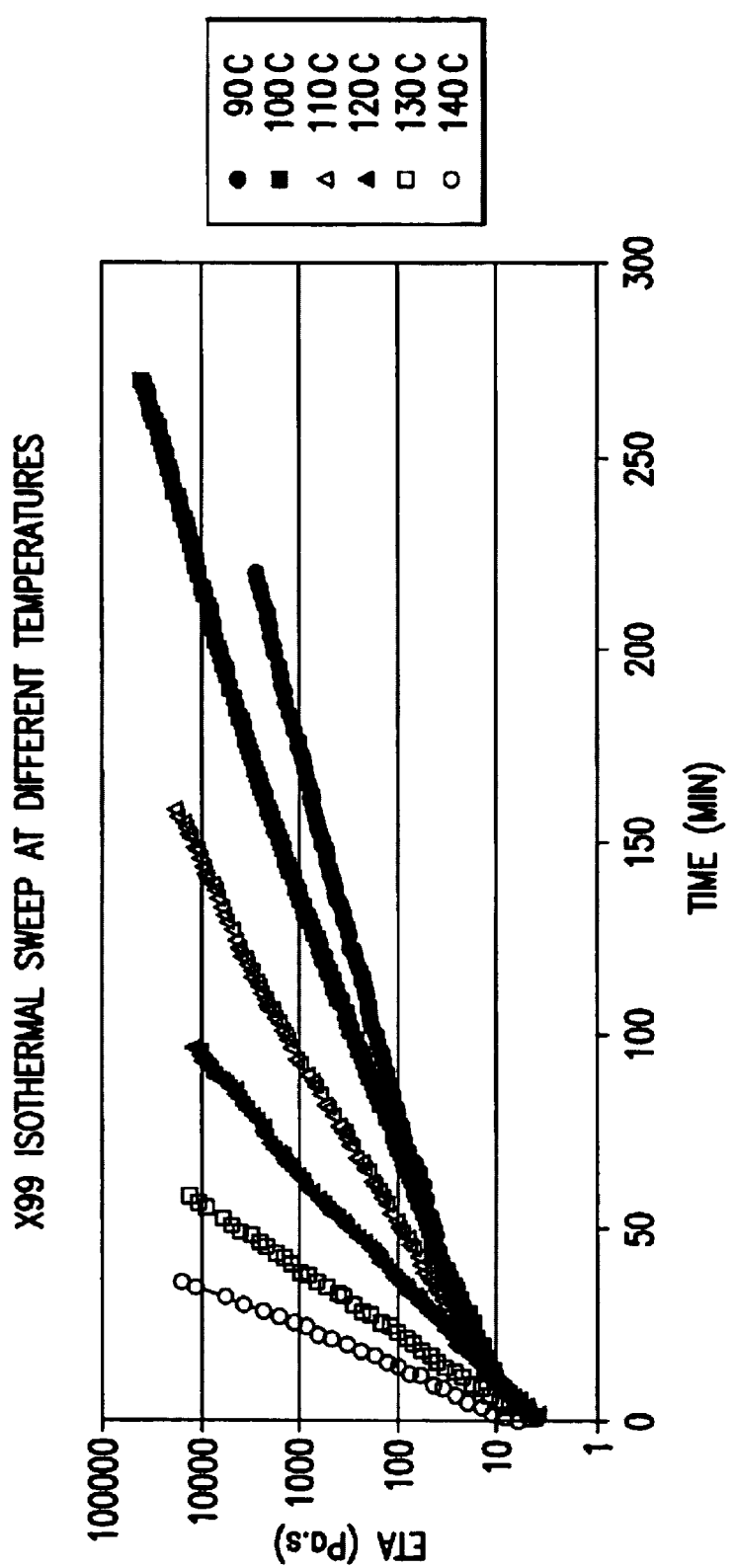
FIG. 3a is graph showing the exothermal sweep of X99 at different temperatures as a function of time.
Figure 3B:
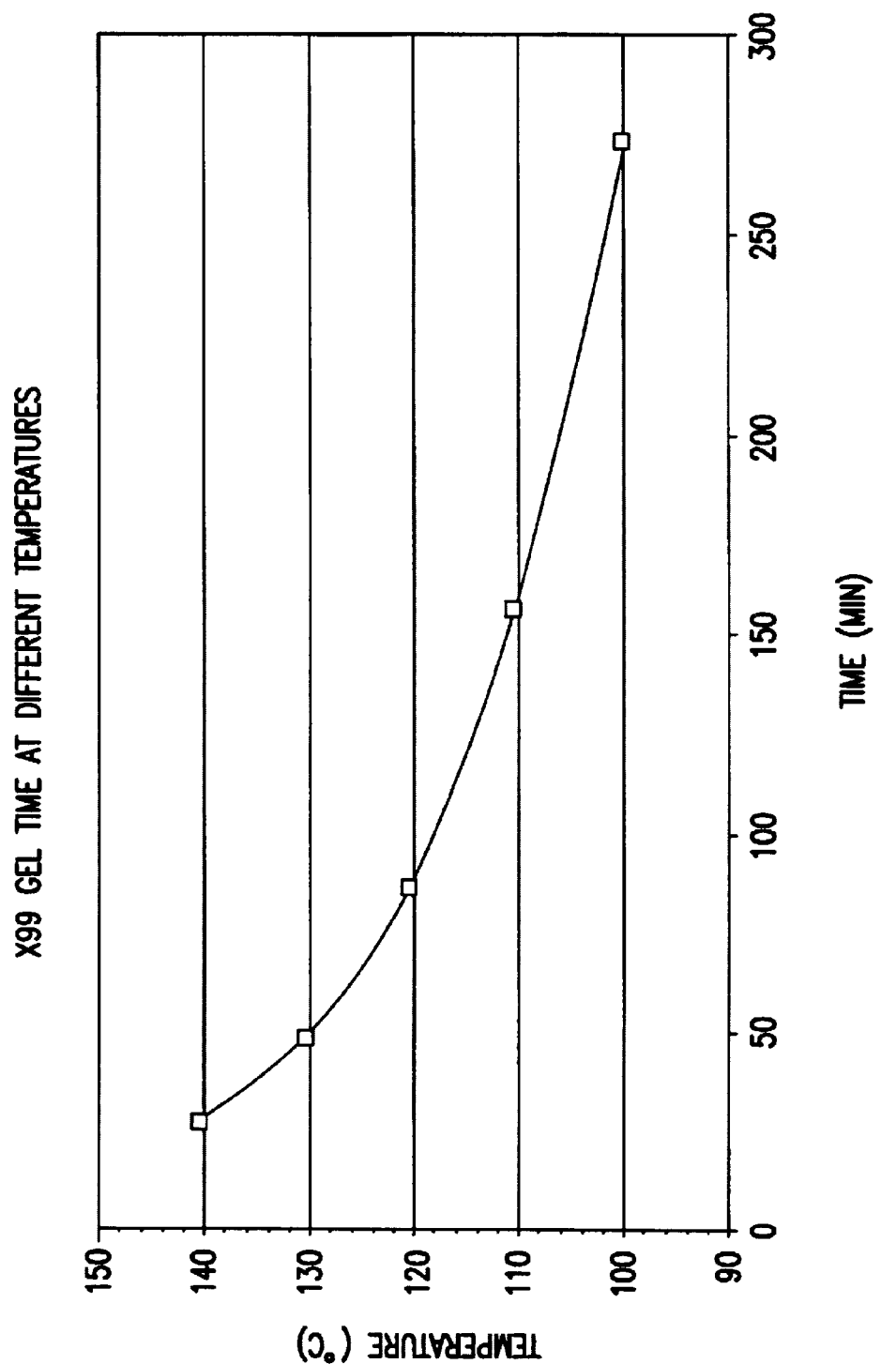
FIG. 3b is graph showing the gel time for X99 cured at different temperatures as a function of time.
Figure 4:
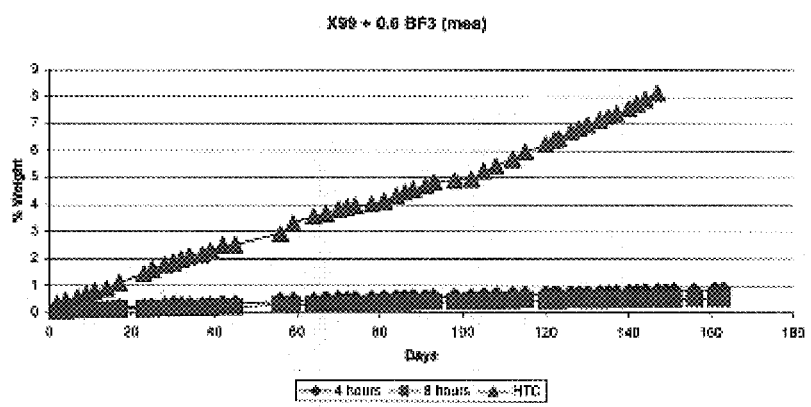
FIG. 4 is graph showing Dichloromethane solvent uptake for X99+0.6BF3(mea) at 25° C. as a function of time.
Figure 5:
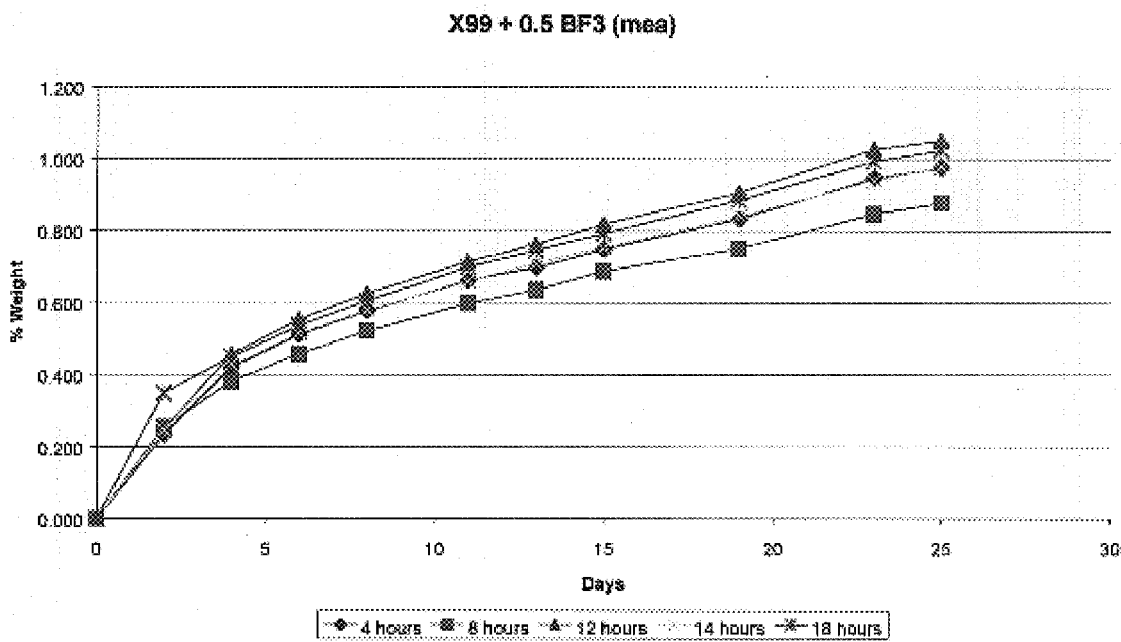
FIG. 5 is graph showing water solvent uptake for X99+0.6BF3(mea) at 25° C. as a function of time.

In its broadest aspect there is provided according to the present invention a curable composition comprising a polyaromatic having reactive end groups, a thermoset resin, and a reactive catalyst, wherein the reactive end groups are adapted to react with the catalyst.

The catalyst comprises a Lewis acid having amine functionality. Preferably the catalyst is of the formula:

Where LXn is a Lewis acid and R is an amine. Preferably L is selected from Groups IIb, IIIb, VIII of the Periodic Table of the Elements and X is halo.

Preferred catalysts include $BF_3$, $AlF_3$, $FeF_3$, $ZnF_2$ as Lewis acid component and primary or secondary aliphatic or aromatic amine such as monoethyl amine (mea), dimethylamine (dma), benzylamine (bea) or piperidine. It is thought that the Lewis acid catalyst is present as a complex or equivalent form which is capable of co-ordinating the reactive end groups of the thermoplast resin with a thermoset resin. The particular Lewis acid complexes of the invention are found to have both a reactive and moderating function whereby the pre-cure reaction has the required selectivity. Without being limited to this theory it is thought that two possible reactions can occur in the curable composition, the reaction between reactive groups of the respective thermoplast and thermoset resin components and the reaction between respective groups of only one of these, for example the reaction between amine group and an epoxy group, or the reaction between an epoxy and a hydroxyl group derived from the ring opening reaction of another epoxy group. The reaction between thermoplast and thermoset resin would be termed chain growth, whereas the self reaction for example of the thermoset would be simply a monophase reaction, in this case of etherification.

It is believed that chain growth dominates the catalytic reactions in the composition of the present invention and helps to promote the chain extension reaction between low molecular weight fractions of the thermoplast polymer. The result would be a controlled build up in the overall molecular weight distribution of the polymer which would lead to phase separation.

The composition may comprise additional components which are conventional in the art. Preferably the composition comprises one or more additional catalyst or curing agents.

The additional curing agent is suitably selected from any known curing agents, for example as disclosed in EP-A-0 311 349, EPA 91310167.1, EP-A-0 365 168 or in PCT/GB95/01303, which are incorporated herein by reference, such as an amino compound having a molecular weight up to 500 per amino group, for example an aromatic amine or a guanidine derivative. Particular examples are 3,3'- and 4-,4'-diaminodiphenylsulphone, (available as "DDS" from commercial sources), methylenedianiline,bis(4-amino-3,5-dimethylphenyl)-1,4 diisopropylbenzene (available as EPON 1062 from Shell Chemical Co); bis(4-aminophenyl)-1,4-diisopropylbenzene (available as EPON 1061 from Shell Chemical Co); 4-chlorophenyl-N,N-dimethyl-urea, eg Monuron; 3,4-dichlorophenyl-N,N-dimethyl-urea, eg Diuron and dicyanodiamide (available as "Amicure CG 1200 from Pacific Anchor Chemical). Other standard epoxy curing agents such as aliphatic diamines, amides, carboxylic acid anhydrides, carboxylic acids and phenols can be used if desired. If a novolak phenolic resin is used as the main thermoset component a formaldehyde generator such as hexamethylenetetraamine (HMT) is typically used as a curing agent.

It is stated in PCT/GB99/00540 for example, and as described in EP-A-0 311 349 or in PCT/GB95/01303, a catalyst for the epoxy resin component/curing agent reaction may also be used, typically a Lewis acid or a base. The present invention differs both in the selection of Lewis acid, having moderating complex function as described above, and in the choice of reactive polyaromatic component.

Preferably the at least one polyaromatic comprises repeating units of the formula.

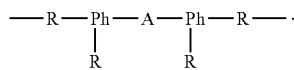

wherein each A independently is selected from a direct link, $SO_2$, oxygen, sulphur, —CO— or a divalent hydrocarbon radical;

R is any one or more substituents of the aromatic rings, each independently selected from hydrogen, $C_{1-8}$ branched or straight chain aliphatic saturated or unsaturated aliphatic groups or moieties optionally comprising one or more heteroatoms selected from O, S, N, or halo for example Cl or F; and groups providing active hydrogen especially OH, $NH_2$, NHR— or —SH, where R— is a hydrocarbon group containing up to eight carbon atoms, or providing other cross-linking activity especially epoxy, (meth) acrylate, cyanate, isocyanate, acetylene or ethylene, as in vinyl, allyl or maleimide, anhydride, oxazoline and monomers containing saturation; and wherein said at least one polyaromatic comprises reactive pendant and/or end groups.

More preferably the at least one polyaromatic comprises at least one polyaryl sulphone comprising ether-linked repeating units, optionally additionally comprising thioether-linked repeating units, the units being selected from the group consisting of

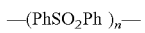

and optionally additionally

wherein Ph is phenylene, n=1 to 2, a=1 to 3 and can be fractional and when a exceeds 1, said phenylenes are linked linearly through a single chemical bond or a divalent group other than —$SO_2$— or are fused together, provided that the repeating unit—$(PhSO_2Ph)_n$— is always present in said at least one polyarylsulphone in such a proportion that on average at least two of said units —$(PhSO_2Ph)_n$— are in sequence in each polymer chain present, said at least one polyarylsulphone having reactive pendant and/or end groups.

Preferably the polyaromatic comprises polyether sulphone, more preferably a combination of polyether sulphone and of polyether ether sulphone linked repeating units, in which the phenylene group is meta- or para- and is preferably para and wherein the phenylenes are linked linearly through a single chemical bond or a divalent group other than sulphone, or are fused together. By "fractional" reference is made to the average value for a given polymer chain containing units having various values of n or a.

Additionally, as also discussed, in said at least one polyarylsulphone, the relative proportions of the said repeating units is such that on average at least two units $(PhSO_2Ph)_n$ are in immediate mutual succession in each polymer chain present and is preferably in the range 1:99 to 99:1, especially 10:90 to 90:10, respectively. Typically the ratio is in the range 25–50 $(Ph)_a$, balance $(PhSO_2Ph)_n$. In preferred polyarylsulphones the units are:

1   

and

11   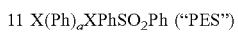

where X is O or S and may differ from unit to unit; the ratio is 1 to 11 (respectively) preferably between 10:90 and 80:20 especially between 10:90 and 55:45.

The preferred relative proportions of the repeating units of the polyarylsulphone may be expressed in terms of the weight percent $SO_2$ content, defined as 100 times (weight of $SO_2$)/(weight of average repeat unit). The preferred $SO_2$ content is at least 22, preferably 23 to 25%. When a=1 this corresponds to PES/PEES ratio of at least 20:80, preferably in the range 35:65 to 65:35.

The above proportions refer only to the units mentioned. In addition to such units the polyarylsulphone may contain up to 50 especially up to 25% molar of other repeating units: the preferred $SO_2$ content ranges (if used) then apply to the whole polymer. Such units may be for example of the formula

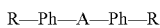

as hereinbefore defined, in which A is a direct link, oxygen, sulphur, —CO— or a divalent hydrocarbon radical. When the polyarylsulphone is the product of nucleophilic synthesis, its units may have been derived for example from one or more bisphenols and/or corresponding bisthiols or phenol-thiols selected from hydroquinone, 4,4'-dihydroxybiphenyl, resorcinol, dihydroxynaphthalene (2,6 and other isomers), 4,4'-dihydroxybenzophenone, 2,2'-di(4-hydroxyphenyl)propane and -methane.

If a bis-thiol is used, it may be formed in situ, that is, a dihalide as described for example below may be reacted with an alkali sulphide or polysulphide or thiosulphate.

Other examples of such additional units are of the formula

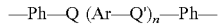
—Ph—Q (Ar—Q')$_n$—Ph— in which Q and Q', which may be the same or different, are CO or SO2; Ar is a divalent aromatic radical; and n is 0, 1, 2, or 3, provided that n is not zero where Q is SO2. Ar is preferably at least one divalent aromatic radical selected from phenylene, biphenylene or terphenylene. Particular units have the formula

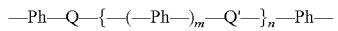
—Ph—Q—{—(—Ph—)$_m$—Q'—}$_n$—Ph— where m is 1, 2 or 3. When the polymer is the product of nucleophilic synthesis, such units may have been derived from one or more dihalides, for example selected from 4,4'-dihalobenzophenone, 4,4'bis(4-chlorophenylsulphonyl)biphenyl, 1,4,bis(4-halobenzoyl)benzene and 4,4'-bis(4-halobenzoyl)biphenyl.

They may of course have been derived partly from the corresponding bisphenols.

The polyaromatic may be the product of nucleophilic synthesis from halophenols and/or halothiophenols. In any nucleophilic synthesis the halogen if chlorine or bromine may be activated by the presence of a copper catalyst.

Such activation is often unnecessary if the halogen is activated by an electron withdrawing group. In any event fluoride is usually more active than chloride. Any nucleophilic synthesis of the polyaromatic is carried out preferably in the presence of one or more alkali metal salts, such as KOH, NaOH or $K_2CO_3$ in up to 10% molar excess over the stoichiometric.

As previously mentioned, said at least one polyaromatic contains reactive end groups and/or pendant groups. End groups may be obtained by a reaction of monomers or by subsequent conversion of product polymers prior to or subsequently to isolation. Preferably groups are of formula —A'—Y where A' is a divalent hydrocarbon group, preferably aromatic, and Y is a group reactive with epoxide groups or with curing agent or with like groups on other polymer molecules. Examples of Y are groups providing active hydrogen especially OH, $NH_2$, NHR' or —SH, where R' is a hydrocarbon group containing up to 8 carbon atoms, or providing other cross-linking reactivity especially epoxy, (meth)acrylate, cyanate, isocyanate, acetylene or ethylene, as in vinyl, allyl or maleimide, anhydride, oxazaline and monomers containing saturation. Preferred end groups include amine and hydroxyl.

The number average molecular weight of the polyaromatic is suitably in the range 2000 to 60000. A useful sub-range is over 9000 especially over 10000 for example 11000 to 25000, or is under 9000, especially in the range of 3000 to 11000, for example 3000 to 9000, and structurally as well as by chemical interaction increases toughness by comparison with that of the thermoset resin alone by providing zones of the tough thermoplast between cross-linked thermset zones.

Thermoset polymers may be selected from the group consisting of an epoxy resin, an addition-polymerisation resin, especially a bis-maleimide resin, a formaldehyde condensate resin, especially a formaldehyde-phenol resin, a cyanate resin, an isocyanate resin, a phenolic resin and mixtures of two or more thereof, and is preferably an epoxy resin derived from the mono or poly-glycidyl derivative of one or more of the group of compounds consisting of aromatic diamines, aromatic monoprimary amines, aminophenols, polyhydric phenols, polyhydric alcohols, polycarboxylic acids and the like, or a mixture thereof, a cyanate ester resin or a phenolic resin. Examples of addition-polymerisation resins are acrylics, vinyls, bis-maleimides, and unsaturated polyesters. Examples of formaldehyde condensate resins are urea, melamine and phenols.

Preferably the thermoset polymer comprises at least one epoxy, cyanate ester or phenolic resin precursor, which is liquid at ambient temperature for example as disclosed in EP-A-0 311 349, EP-A-0 365 168, EPA 91310167.1 or in PCT/GB95/01303. Preferably the thermoset is an epoxy resin.

An epoxy resin may be selected from N,N,N'N'-tetraglycidyl diamino diphenylmethane (eg "MY 9663", "MY 720" or "MY 721" sold by Ciba-Geigy) viscosity 10–20 Pa s at 50° C.; (MY 721 is a lower viscosity version of MY720 and is designed for higher use temperatures); N,N,N',N'-tetraglycidyl-bis(4-aminophenyl)-1,4-diisopropylbenzene (eg Epon 1071 sold by Shell Chemical Co) viscosity 18–22 Poise at 110° C.; N,N,N',N'-tetraglycidyl-bis(4-amino-3,5-dimethylphenyl)-1,4-diisopropylbenzene, (eg Epon 1072 sold by Shell Chemical Co) viscosity 30–40 Poise at 110° C.; triglycidyl ethers of p-aminophenol (eg "MY 0510" sold by Ciba-Geigy), viscosity 0.55–0.85 Pa s at 25° C.; preferably of viscosity 8–20 Pa at 25° C.; preferably this constitutes at least 25% of the epoxy components used; diglycidyl ethers of bisphenol A based materials such as 2,2-bis(4,4'-dihydroxy phenyl) propane (eg "DE R 661" sold by Dow; or "Epikote 828" sold by Shell), and Novolak resins preferably of viscosity 8–20 Pa s at 25° C.; glycidyl ethers of phenol Novolak resins (eg "DEN 431" or "DEN 438" sold by Dow), varieties in the low viscosity class of which are preferred in making compositions according to the invention; digylcidyl 1,2-phthalate, eg GLY CEL A-100; diglycidyl derivative of dihydroxy diphenyl methane (Bisphenol F) (eg "PY 306" sold by Ciba Geigy) which is in the low viscosity class. Other epoxy resin precursors include cycloaliphatics such as 3', 4'-epoxycyclohexyl-3,–4-epoxycyclohexane carboxylate (eg "CY 179" sold by Ciba Geigy) and those in the "Bakelite" range of Union Carbide Corporation.

A cyanate ester resin may be selected from one or more compounds of the general formula NCOAr($Y_xAr_m$)$_q$OCN and oligomers and/or polycyanate esters and combinations thereof wherein Ar is a single or fused aromatic or substituted aromatics and combinations thereof and therebetween nucleus linked in the ortho, meta and/or para position and x=0 up to 2 and m and q=0 to 5 independently. The Y is a linking unit selected from the group consisting of oxygen, carbonyl, sulphur, sulphur oxides, chemical bond, aromatic linked in ortho, meta and/or para positions and/or $CR_1R_2$ wherein $R_1$ and $R_2$ are hydrogen, halogenated alkanes, such as the fluorinated alkanes and/or substituted aromatics and/or hydrocarbon units wherein said hydrocarbon units are singularly or multiply linked and consist of up to 20 carbon atoms for each $R_1$ and/or $R_2$ and P($R_3R_4R'_4R_5$) wherein $R_3$ is alkyl, aryl, alkoxy or hydroxy, $R'_4$ may be equal to $R_4$ and a singly linked oxygen or chemical bond and $R_5$ is doubly linked oxygen or chemical bond or Si($R_3R_4R'_4R_6$) wherein $R_3$ and $R_4$, $R'_4$ are defined as in P($R_3R_4R'_4R_5$) above and $R_5$ is defined similar to $R_3$ above. Optionally, the thermoset can consist essentially of cyanate esters of phenol/formaldehyde derived Novolaks or dicyclopentadiene derivatives thereof, an example of which is XU71787 sold by the Dow Chemical Company.

A phenolic resin may be selected from any aldehyde condensate resins derived from aldehydes such as methanal, ethanal, benzaldehyde or furfuraldehyde and phenols such as phenol, cresols, dihydric phenols, chlorphenols and $C_{1-9}$ alkyl phenols, such as phenol, 3- and 4-cresol (1-methyl, 3- and 4-hydroxy benzene), catechol (2-hydroxy phenol), resorcinol (1,3-dihydroxy benzene) and quinol (1,4-dihydroxy benzene). Preferably phenolic resins comprise cresol and novolak phenols.

The thermoset polymer is suitably the product of at least partly curing a resin precursor using a curing agent and optionally a catalyst.

The weight proportion of thermoplast component in the composition is typically in the range 5 to 100%, preferably 5 to 90%, especially 5 to 50, for example 5 to 40%. In a particular advantage of the invention the weight proportion of thermoplast component may be selected in the range 10 to 30% for desired level of tack in the final composition.

The respective components may be present in any amounts which are suitable for the reaction thereof. Preferably the thermoset and thermoplast resin components are present in amounts respectively of 15–75 parts by weight and in appropriate stoichiometry.

Preferably the thermoplast resin or the thermoplast resin and addition reactive amine containing component (DDS) are present in an amount of 35–55, more preferably 40–50 parts by weight and the epoxy component is present in an amount of 45–75, preferably 50–60 parts by weight.

The Lewis acid catalyst is present in catalytic effective amount in the range of 0.1–5.0 parts by weight, depending on the catalyst of choice. More preferably the catalyst is present in an amount of 0.2–3.0 parts by weight.

A resin composition is particularly suitable for fabrication of structures, including load-bearing or impact resisting structures. For this purpose it may contain a reinforcing agent such as fibres. Fibres can be added short or chopped typically of mean fibre length not more than 2 cm, for example about 6 mm. Alternatively, and preferably, the fibres are continuous and may, for example, be unidirectionally-disposed fibres or a woven fabric, ie the composite material comprises a prepreg. Combinations of both short and/or chopped fibres and continuous fibres may be utilised. The fibres may be sized or unsized. Fibres can be added typically at a concentration of 5 to 35, preferably at least 20%, by weight. For structural applications, it is preferred to use continuous fibre for example glass or carbon, especially at 30 to 70, more especially 50 to 70% by volume.

The fibre can be organic, especially of stiff polymers such as poly paraphenylene terephthalamide, or inorganic. Among inorganic fibres glass fibres such as "E" or "S" can be used, or alumina, zirconia, silicon carbide, other compound ceramics or metals. A very suitable reinforcing fibre is carbon, especially as graphite. Graphite fibres which have been found to be especially useful in the invention are those supplied by Amoco under the trade designations T650-35, T650-42 and T300; those supplied by Toray under the trade designation T800-HB; and those supplied by Hercules under the trade designations AS4, AU4, IM 8 and IM 7.

Organic or carbon fibre is preferably unsized or is sized with a material that is compatible with the composition according to the invention, in the sense of being soluble in the liquid precursor composition without adverse reaction or of bonding both to the fibre and to the thermoset/thermoplastic composition according to the invention. In particular carbon or graphite fibres that are unsized or are sized with epoxy resin precursor or thermoplast such as polyarylsulphone are preferred. Inorganic fibre preferably is sized with a material that bonds both to the fibre and to the polymer composition; examples are the organo-silane coupling agents applied to glass fibre.

The composition may contain for example conventional toughening agents such as liquid rubbers having reactive groups, aggregates such as glass beads, rubber particles and rubber-coated glass beads, filler such as polytetrafluorethylene, silica, graphite, boron nitride, mica, talc and vermiculite, pigments, nucleating agents, and stabilisers such as phosphates. The total of such materials and any fibrous reinforcing agent in the composition should be at least 20% by volume, as a percentage of the total volume of the polyaromatic/thermoset mixture. The percentages of fibres and such other materials are calculated on the total composition after curing at the hereinbelow defined temperatures.

In a further aspect of the invention there is provided a process for the preparation of a composition as hereinbefore defined comprising admixing the respective polyaromatic and thermoset components as hereinbefore defined and subsequently admixing the catalyst.

Preferably the composition is used in the form of a curable resin composition as hereinbefore defined, made by mixing the polyaromatic, thermoset precursor and (at some stage) any fibrous reinforcing agent and other materials. A solvent may be present. The solvent and the proportion thereof are chosen so that the mixture of polyaromatic and thermoset resin precursor form at least a stable emulsion, preferably a stable apparently single-phase solution. The ratio of solvent to polyaromatic is suitable in the range 5:1 to 20:1 by weight. Preferably a mixture of solvents is used, for example of a halogenated hydrocarbon and an alcohol, in a ratio suitably in the range 99:1 to 85:15. Conveniently the solvents in such a mixture should boil at under 100° C. at 1 atm pressure and should be mutually miscible in the proportions used. Alternatively the polyaromatic and thermoset or precursor can be brought together by hot melting and/or high shear mixing.

The mixture is stirred until sufficiently homogeneous. Thereafter any solvent is removed by evaporation to give a resin composition. Evaporation is suitably at 50–200° C. and, at least in its final stages, can be at subatmospheric pressure, for example in the range 13.33 Pa to 1333 Pa (0.1 to 10 mm Hg). The resin composition preferably contains up to 5% w/w of volatile solvent, to assist flow when used to impregnate fibres. This residual solvent will be removed in contact with the hot rollers of the impregnating machine.

After removal of residual solvent, the reactive catalyst is added a short time prior to casting and curing or immediately prior to casting and cure.

The resin composition, possibly containing some volatile solvent already present or newly added, can be used for example as an adhesive or for coating surfaces or for making solid structures by casting possibly in a foamed state. Short fibre reinforcement may be incorporated with composition prior to curing thereof. Preferably a fibre-reinforced composition is made by passing essentially continuous fibre into contact with such resin composition. The resulting impregnated fibrous reinforcing agent may be used alone or together with other materials, for example a further quantity of the same or a different polymer or resin precursor or mixture, to form a shaped article. This technique is described in more detail in EP-A-56703, 102158 and 102159.

In a further aspect of the invention there is provided a process for curing a curable composition as hereinbefore defined.

The curable resin composition of the invention may be cured in known manner. Suitably the composition in form of a resin solution or stable emulsion as hereinbefore described is transferred onto a suitable mould or tool for preparation of a panel, prepreg or the like, the mould or tool having been preheated to a desired degassing temperature.

The stable emulsion is combined with any reinforcing, toughening, filling, nucleating materials or agents or the like, and the temperature is raised to initiate curing thereof. Suitably curing is carried out at elevated temperature up to 200° C., preferably in the range of 60 to 200° C., more preferably at about 70–190° C., and with use of elevated pressure to restrain deforming effects of escaping gases, or to restrain void formation, suitably at pressure of up to 10 bar, preferably in the range of 3 to 7 bar abs. Suitably the cure temperature is attained by heating at up to 5° C./min, for example 2° C. to 3° C./min and is maintained for the required period of up to 18 hours, preferably up to 9 hours, more preferably up to 6 hours, for example 3 to 4 hours. Pressure is released throughout and temperature reduced by cooling at up to 5° C./min, for example up to 3° C./min. Post-curing at temperatures in the range of 150° C. to 200° C. may be performed, at atmospheric pressure, employing suitable heating rates to improve the glass transition temperature of the product or otherwise.

Curing may be in a single stage or in two stages, depending on selected cure temperature and requirements of processing and product. For example curing may be conducted in an autoclave for the entire procedure, or for the pre-cure only. In a first embodiment the method for curing a composition as hereinbefore defined comprises in a single stage subjecting the composition to elevated temperature and elevated pressure for a period in excess of an hour, wherein temperature is in the range 150–200° C., preferably 170–190° C. for a period in the range 4 to 7 hours.

In a further embodiment the method for curing a composition as hereinbefore defined comprises pre-curing at elevated temperature and pressure for a period in excess of for an hour wherein the pre-cure temperature is in the region 60–150° C., preferably 70–145° C., more preferably 80–135° C.

The pre-cure is preferably achieved by initially employing a time-temperature ramp as known in the art to achieve a desired precure temperature.

It is surprisingly found that under these precure conditions the composition selectively reacts to promote chain extension reactions as hereinbefore described.

The precure is suitably carried out for a period of time from 1–18 hours, preferably from 10 to 18 hours, more preferably from 12 to 5 hours.

In a further aspect of the invention there is provided a pre-cured composition or pre-preg of a polyaromatic thermoplast and thermoset resin comprising a chain extended thermoplast as hereinbefore defined, hating number average molecular weight in the range 3,000–30,000, unreacted thermoset as hereinbefore defined and a catalyst as hereinbefore defined and optional reinforcement wherein the cured composition has a glass transition temperature in the range 50–70° C. and wherein the unreacted thermoset is present in an amount of up to 50 parts by weight, for example 30 to 50 parts by weight.

The cured composition is surprisingly suited for post cure reaction of the remaining thermoset in the form of self reaction. It has been found that with some conventional compositions, further curing fails to advance the properties of the material.

In a further aspect of the invention there is provided a method for postcuring a pre-cured resin or pre-preg as hereinbefore defined at elevated temperature for a period of in excess of one hour wherein the temperature is in the range of 150–200° C., preferably 170–190° C.

Postcuring may be at ambient or elevated pressure and is preferably at ambient or slightly elevated pressure not requiring the use of an autoclave.

Without being limited to this theory it is thought that during the post cure the catalyst promotes self reaction, such as an etherification reaction for example with an epoxy thermoset, which establishes the thermal and environmental properties of the resin. These can produce composite materials with excellent mechanical properties, improved environmental resistance over that of the state of the art materials and excellent thermal properties. It is particularly surprising that the compositions of the inventions are suited for distinct pre cure and post cure reactions under suitable conditions, the respective reactions being selective at those conditions and providing a product architecture which is well defined and well controlled and associated with specific advantageous properties.

The post cure reaction is carried out with use of conventional time-temperature ramping as known in the art, and commencing at a temperature which does not exceed the Tg of the precured composition or pre-preg. The post cure is suitably carried out for a period of time from 1 to 8 hours, preferably 1 to 5 hours, more preferably from 1 to 3 hours.

It has surprisingly been found that the precured composition or pre-preg of the invention has sufficient dimensional stability to enable post curing without use of an autoclave or of moulds or tools used in the initial reaction. This gives the freedom to conduct postcuring at higher temperatures without needing to take up autoclave space for further extended periods, and without subjecting moulds or tools to further elevated temperatures.

It is a particular advantage of the invention that low temperature cure enables use of composite tooling or moulds which can be readily and cheaply prepared and are suited to withstand the lower cure temperatures employed in the precure.

In a further aspect of the invention there is provided a method for curing a curable composition as hereinbefore defined wherein the composition is formed in a composite tool or mould in the precure stage and subsequently removed from the tool or mould for post curing.

A further procedure comprises forming incompletely cured composition into film by for example compression moulding, extrusion, melt-casting or belt-casting, laminating such films to fibrous reinforcing agent in the form of for example a non-woven mat of relatively short fibres, a woven cloth or essentially continuous fibre in conditions of temperature and pressure sufficient to cause the mixture to flow and impregnate the fibres and curing the resulting laminate.

Plies of impregnated fibrous reinforcing agent, especially as made by the procedure of one or more of EP-A56703, 102158, 102159, can be laminated together by heat and pressure, for example by autoclave, vacuum or compression moulding or by heated rollers, at a temperature above the curing temperature of the thermosetting resin or, if curing has already taken place, above the glass transition temperature of the mixture, conveniently at least 180° C. and typically up to 200° C., and at a pressure in particular in excess of 1 bar, preferably in the range of 1–10 bar.

The resulting multi-ply laminate may be anisotropic in which the fibres are continuous and unidirectional, orientated essentially parallel to one another, or quasi-isotropic in each ply of which the fibres are orientated at an angle, conveniently 45° as in most quasi-isotropic laminates but possibly for example 30° or 60° or 90° or intermediately, to those in the plies above and below. Orientations intermediate between anisotropic and quasi-isotropic, and combination laminates, may be used. Suitable laminates contain at least 4 preferably at least 8, plies. The number of plies is dependent on the application for the laminate, for example the strength required, and laminates containing 32 or even more, for example several hundred, plies may be desirable. There may be aggregates, as mentioned above in interlaminar regions. Woven fabrics are an example of quasi-isotropic or intermediate between anisotropic and quasi-isotropic.

It has also been found that the cured materials present a well defined co-continuous morphology. The materials also demonstrate exceptional fracture toughness properties (which has been shown to translate into composite). These values are higher than the conventional high temperature cured material and are achieved using lower amounts of thermoplast, for example up to 15% less thermoplast. A further surprising feature is solvent resistance properties of the materials. Neat resin samples immersed in dichloromethane at room temperature absorb less than 0.5% after 100 days. The conventional high temperature cured resin would have absorbed in excess of 4% after such a period of time.

In a further aspect of the invention there is provided a cured neat resin comprising a chain extended polyaromatic thermoplast anchored by reaction of reactive end groups within a thermoset network wherein the resin has a Tg in excess of 150° C., for example in the range 150–185° C., more preferably in the range 170–185° C., wherein up to 100% of the thermoset component is consumed in the reaction, for example 60–90% is consumed.

In a further aspect of the invention there is provided a method for curing cycle design for curing a composition as hereinbefore defined in a single cure stage or in pre and post cure stages. The cycle design may be selected using known principles which apply in this case to the compositions of the invention, and which are represented by an exponential relationship of time and temperature.

TABLE

Illustrative cure cycles

| Precuring temperature/° C. | Precuring time/hours | Post curing temperature/° C. | Postcuring time/hours |
|---|---|---|---|
| 85 | 14 (autoclave) | 180 | 2 (freestanding) |
| 105 | 8 | 180 | 2 |
| 115 | 5.5 | 180 | 2 |
| 125 | 3 | 180 | 2 |
| 135 | 1.5 | 180 | 2 |
| — | — | 180 | 2 |

The method for curing cycle design may employ considerations such as gel time of composition, the risk of vacuum bag creep or rupture for structures within autoclave for extended periods, autoclave lead time in particular in industries requiring high production rates, and autoclave optimisation in cases that autoclaving prevents other components being simultaneously autoclaved.

In a further aspect of the invention there is provided a composite comprising a post cured pre-preg as hereinbefore defined. The composite may be provided in the form of a shaped article.

In a further aspect of the invention there is provided the use of a composite tool or mould in a method as hereinbefore defined.

In a further aspect of the invention there is provided the use of a composition, cured resin, composite or shaped product as hereinbefore defined in the aerospace, marine or construction industry as a composite or adhesive, or in the manufacture of an aeronautical, land or nautical vehicle, building or commercial product or component thereof.

The invention is now illustrated in non limiting manner with reference to the following examples.

EXAMPLE 1

Curable Compositions

The epoxies used were as follows;
MY0510—Trifunctional epoxy based on amino phenol
PY306—A difunctional epoxy based on oligomers of Bisphenol F.

The principal curing agent used was that of 3,3'-diaminodiphenylsulphone which was co-cured with a number of LTC catalysts which were as follows;
$BF_3$(mea), $BF_3$ (dma), $BF_3$ (benzylamine), $BF_3$ (piperidine)
Diuron, Chlorotoluron, Fenuron, CA150
Curamid CN
DICY.

The thermoplastic which was used to toughen the systems is commercially available as DDES (3,3'-bis(diamino diphenyl ether)sulphone, based on a 40:60 PES:PEES Copolymer with primary amine termination synthesised by reacting 1 mole of DCDPS with two moles of m-Aminophenol using Potassium Carbonate as the catalyst and Sulpholane as the reaction solvent.

EXAMPLE 2

Preparation of Compositions X99+0.5$BF_3$(dma)

Resin formulations were prepared by warming the two epoxies. The temperature of the epoxies was not allowed to exceed that of 60° C. The thermoplastic resin, previously dissolved in a small amount of Dichloromethane, was then added in an amount of from 10–40 wt %. Once the resins had been warmed and their viscosity reduced the Diaminodiphenylsulphone was then added. The solvent was then removed at 60° C. The DDS was dispersed by vigorous stirring. Prior to the pre cure the low temperature cure catalyst, $BF_3$(dma), was added and thoroughly dispersed within the resin which was cast as neat resin panels in a mould, with evaporation of solvent. The samples were then cured at 85° C. over a period of time from 1 to 18 hours. The samples were then characterised by FTIR in order to determine the remaining epoxide content and the level of ether generated in the systems. A limited number of these samples were then post cured at 175° C. for 2 hours. In order to eliminate the temperature fluctuation of just turning the ovens up to 175° C. a ramp rate of 2° C. per minute, and several other ramp rate effects were studied.

EXAMPLE 2.1

Preparation of Samples for Determination of Tg

The samples used for the FTIR study were also used to determine the Tg of the respective system. In some cases this meant employing the use of DSC (in the case of liquid or soft materials). In the case's where specimens were hard at room temperature, Tortional Rheometry was employed. Specimens were cut from the FTIR samples whose dimensions were 5 cm's in length, 1 cm in width and <2 mm in thickness. In some case's Dynamic Mechanical Thermal Analysis (DMTA) was used to determine the materials glass transition temperature (Tg).

EXAMPLE 2.2
FTIR Equipment Used

Standard FTIR equipment was used which was capable of overlapping spectrums and calculating the level of ether and epoxide from the peak intensity. For the ether groups the peak at 1115 cm$^{-1}$ was assigned and for the epoxide the peak at 912 cm$^1$ was assigned.

EXAMPLE 2.3
Neat Resin Mechanical Properties.

A neat resin screen was carried out in order to determine a range of mechanical properties. Neat resin panels (6"*4"*3 mm) were prepared according to Example 2.

EXAMPLE 2.4
Neat Resin Morphology

Samples from panels prepared under 2.3 were examined by TEM to determine the morphology of the respective system.

EXAMPLE 2.5
Solvent Uptake Experiments

Cured samples were prepared as neat resin discs which were about 2" in diameter and about 3 mm thick. The neat resin samples were pre-dried, prior to immersion in solvent, at 135° C. for about 6 hours.

EXAMPLE 3.1
PREPARATION OF COMPOSITIONS X99+0.5BF$_3$(mea)

Formulations were prepared using the procedure of Example 2.

EXAMPLE 3.1.1
Neat Resin Mechanical Properties

For the above formulation 6"*4"*3 mm panels were prepared by curing the resin systems for 18 hours at 85° C. After cooling the panels were placed in a free standing air circulating oven and cured at 175° C. for 2 hours using a ramp rate of 2C per minute.

The fully cured panels were then assessed using the following tests;
Fracture Toughness (G1c)
Fracture Strength (K1c)
Modulus
Tensile Yield Strength
Ductility Factor Table I, details the results of the neat resin mechanical assessment and also includes the results of a conventionally high temperature cured system.

TABLE I

| Material | Fracture Toughness | Fracture Strength | Tensile Yield Strength | Ductility Factor | Modulus |
|---|---|---|---|---|---|
| X99* | 0.67 | 1.34 | 127 | 0.11 | 3.1 |
| X99** | 0.29 | 1.09 | 117 | 0.06 | 3.0 |
| X99 + 0.5 BF3 (mea)** | 0.77 | 1.77 | 135 | 0.18 | 3.5 |
| X99TB + 0.5 BF3 (mea)*** | 0.9 | 1.85 | 133 | 0.2 | 3.4 |

*Cured For 3 hours at 175 C. (20% Amine ended thermoplastic)
**Cured For 18 hours at 85 C. and post cured for 2 hours at 175 C. (20% Amine ended thermoplastic)
***Cured for 18 hours at 85 C. and post cured for 2 hours at 175 C. (23% Amine ended thermoplastic)

As can be seen from Table I the conventionally high temperature cured system produces the kind of neat resin fracture properties typical for that level of thermoplastic. However when the same material is subjected to a low temperature pre-cure of 18 hours at 85° C. followed by a post cure for 2 hours at 175 C the fracture properties are considerably lower.

If the same material is again cured at 85 and then post cured at 175 C but a low temperature catalyst (BF3(mea)) is incorporated then the fracture properties rise and in fact appear to be tougher than the conventional HTC system. This is increased further when additional thermoplastic is added to the formulation.

EXAMPLE 3.1.2

Neat Resin Morphology (Transmission Electron Microscopy)—TEM

Annex I contains the TEM micrographs for all of the formulations detailed in Table I.

In the case of the X99** there is no visible evidence of a phase separated morphology. The neat resin fracture properties suggest that the system has not undergone a two phase separated system. In the case of X99* the size of the phase separated morphology is below the detection limit of the TEM technique. However the fracture properties of the material do suggest that a two phase system is present.

Observing X99+0.5 BF3(mea) and X99TB*+0.5 BF3(mea) it can be seen that a co-continuous morphology exists in both samples.

EXAMPLE 3.1.3

FTIR

Samples were prepared as detailed under Example 2 and then characterised using FTIR to determine the level of epoxy remaining and the amount of ether produced as a function of time the results of which can be seen in the following Table's.

TABLE II

| Time at 85° C. | Ether/Aromatic Ratio | Epoxy/Aromatic Ratio | % Epoxy Remaining |
|---|---|---|---|
| X99 (Cured for x hours at 85 C.) | | | |
| 0 | 0.5 | 1.28 | 100 |
| 1 | 0.61 | | |
| 2 | 1.03 | 1.09 | 85 |
| 3 | 0.54 | 1.04 | 81 |
| 4 | 0.53 | 0.98 | 76 |
| 5 | 1.12 | | |
| 6 | 0.92 | 0.98 | 76 |
| 8 | 1.1 | 0.93 | 73 |
| 10 | 1.72 | 0.92 | 72 |
| 12 | 1.89 | 0.82 | 64 |
| 14 | 2.14 | 0.72 | 56 |
| 18 | 2.47 | 0.68 | 53 |
| Samples from Table II post cured for 2 hours at 175 C. using a 2 C./min ramp rate. | | | |
| 2 | 3.5 | 0.16 | 12.5 |
| 4 | 3.7 | 0.17 | 13 |
| 6 | 3.8 | 0.17 | 13 |
| 8 | 3.7 | 0.15 | 12 |
| 10 | 3.8 | 0.18 | 13.5 |
| 12 | 3.9 | 0.15 | 12 |

TABLE III

X99 (Cured for 3 hours at 175 C.)

| Time at 175° C. (mins) | Ether/ Aromatic Ratio | Epoxy/ Aromatic Ratio | % Epoxy Remaining |
|---|---|---|---|
| 0 | 0.81 | 1.09 | 100 |
| 5 | 0.72 | 1.04 | 95 |
| 10 | 2.15 | 0.65 | 60 |
| 15 | 3.87 | 0.18 | 17 |
| 20 | 4.43 | 0.18 | 17 |
| 25 | 4.31 | 0.15 | 14 |
| 30 | 4.2 | 0.15 | 14 |
| 45 | 4.2 | 0.14 | 13 |
| 75 | 4.1 | 0.15 | 14 |
| 90 | 4.22 | 0.15 | 14 |
| 105 | 4.19 | 0.15 | 14 |
| 120 | 4.2 | 0.18 | 17 |
| 135 | 4.21 | 0.15 | 14 |
| 150 | 4.45 | 0.13 | 12 |
| 165 | 4.66 | 0.12 | 11 |
| 180 | 4.5 | 0.13 | 12 |

TABLE IV

| Time at 85° C. | Ether/Aromatic Ratio | Epoxy/Aromatic Ratio | % Epoxy Remaining |
|---|---|---|---|
| X99 + 0.5 BF3 (mea) Cured at 85 C. as a function of time. | | | |
| 0 | 0.61 | 1.13 | 100 |
| 1 | 1.71 | 0.77 | 68 |
| 2 | 2.01 | 0.72 | 64 |
| 3 | 2.12 | 0.7 | 62 |
| 4 | 2.27 | 0.66 | 58 |
| 5 | 2.49 | 0.66 | 58 |
| 6 | 2.51 | 0.63 | 56 |
| 8 | 2.5 | 0.57 | 50 |
| 10 | 2.58 | 0.52 | 46 |
| 12 | 2.67 | 0.52 | 46 |
| 14 | 2.96 | 0.46 | 41 |
| 16 | 3.2 | 0.43 | 38 |
| 18 | 3.2 | 0.43 | 38 |
| Samples from Table IV post cured for 2 hours at 175 C. using a ramp rate of 2 C./min. | | | |
| 2 | 3.6 | 0.2 | 19 |
| 4 | 3.43 | 0.2 | 18 |
| 6 | 3.67 | 0.17 | 15 |
| 8 | 3.38 | 0.18 | 16 |
| 10 | 3.52 | 0.16 | 14 |
| 12 | 3.34 | 0.19 | 17 |

Samples were pre cured at different temperatues and the results are shown in Figures I and II As an indication of reaction, isothermal sweep and gel time were determined and the results are shown in Figure IIIa and IIIb.

EXAMPLE 3.1.4

Pre-cured and Post cured Tg's

Sample for the determination of Tg were prepared as described in 2.1 and were determined using either DSC or Tortional Rheometry, depending upon the physical nature of the specimen.

The HCT version of X99 was cured for 3 hours at 175 C and it's Tg was determined using both Tortional Rheometry. The value for the Tg was in the range of 170–180 C by DMTA and 170–180 C, using the value for G', by Tortional Rheometrics.

X99 and X99+0.5 BF3(mea) were subjected to a precure at 85 C as a function of time and Tg data was collected. These samples were also post cured at 175 C for 2 hours using a ramp rate of 2 C/min. Table V represents the Tg data for both the pre-cured and post cured specimens.

TABLE V

| X99 Time at 85 C. (Hours) | Tg (DSC) Pre-cured | Tg (TR) Post cured | X99 + BF3 (mea) Time at 85 C. (Hours) | Tg (DSC) Pre-cured | Tg (Th) Post cured |
|---|---|---|---|---|---|
| 4.5 | −14.1 | 156 | 2 | 56 | 174 |
| 9.0 | −6.0 | 156 | 4 | 55 | 178 |
| 13.5 | 6.7 | 157 | 6 | 65 | 176 |
| 18.0 | 24 | 156 | 8 | 69 | 178 |
| | | | 12 | 88 | 177 |
| | | | 18 | 98 | 176 | was subjected to a pre-cure at 85 C as a function of time and Tg data was collected. These samples were also post cured at 175 C for 2 hours using a ramp rate of 2 C/min.

As can be seen from the above Table the addition of the 0.5 BF3(mea) has had a significant effect upon the pre-cured Tg and has also had little effect upon the post cured Tg which is still in the region of 175 C, as observed for the HTC cured system.

Samples were also precured at a range of temperatures as a function of time and Tg data collected. The results are shown in Table VI

| Time/ hours | Tg (pre) 105° C. | Tg (post) 105° C. | Tg (pre) 115° C. | Tg (post) 115° C. | Tg (pre) 125° C. | Tg (post) 125° C. |
|---|---|---|---|---|---|---|
| 4 | 75 | 151 | | | | |
| 5 | 76 | 142 | 83.5 | 154 | 109 | 153 |
| 6 | | | | | 117 | 149 |
| 7 | | | 95.7 | 174 | | |
| 8 | 84.6 | | | | | |
| 9 | 93 | | | | | |
| 11 | 97.4 | | | | | |

EXAMPLE 3.1.5

Solvent Uptake for X99+0.6 BF3(mea)

Figures IV shows results for Dichloromethane at 25 C–X99+0.6 BF3(mea).

Also included in Figures IV are the solvent uptake results for the X99 system cured for 3 hours at 175 C. As can be seen from the results shown in that Figure, the addition of the BF3(mea) and the inclusion of the pre-cure hold have produced a post cured resin sample which has exceptional resistance to Dichloromethane at 25 C.

Figures V shows results for water at 25C–X99+0.5 BF3 (mea).

Similarly, Figures VI shows results for MethylEthylKetone at 25 C–X99+0.5 BF3(mea)

The solvent uptake in all three solvents was identical for the X99TB+0.5 BF3(mea). Solvent uptake was also investigated with dichloromethane, methyl ethyl ketone and water for discs and prepregs, including different prepreg lay ups: [0]16, [(0,90)4]s, [(+45, 0,−45,90)2]s, and compared with commercial low temperature cure systems using curimid catalyst. The system of the invention was found to show lower solvent uptake in all cases, and in addition showed resistance to MEK which appeared to chemically attack the comparison curimid system.

EXAMPLE 3.2

Preparation of Compositions X99+Alternative Boron Trifluoride Catalysts

The alternative BF3 catalysts which were considered were;
BF3(dma)
BF3((bea)
BF3(pip)

EXAMPLE 3.2.1

Neat Resin Mechanical Properties

Using the procedure of Example 2 fully cured panels were assessed using the tests outlined in Example 3.1.1;

Table VII, details the results of the neat resin mechanical assessment and also includes the results of Example 3.1.1 and of a conventionally high temperature cured system.

TABLE VII

| Material | Fracture Toughness | Fracture Strength | Tensile Yield Strength | Ductility Factor | Modulus |
|---|---|---|---|---|---|
| X99* | 0.67 | 1.34 | 127 | 0.11 | 3.1 |
| X99** | 0.29 | 1.09 | 117 | 0.06 | 3.0 |
| X99 + 0.5 BF3 (mea)** | 0.77 | 1.77 | 135 | 0.18 | 3.5 |
| X99TB + 0.5 BF3 (dma)** | 0.75 | 1.58 | 133 | 0.19 | 3.4 |
| X99TB + 0.5 BF3 (pip)** | 0.8 | 1.82 | 133 | 0.21 | 3.5 |

*Cured For 3 hours at 175 C. (20% Amine ended thermoplastic)
**Cured For 18 hours at 85 C. and post cured for 2 hours at 175 C. (20% Amine ended thermoplastic)

As can be seen from the above table the neat resin fracture properties are the same for all the three different types of BF3 catalyst.

Tests were also conducted comparing the post cured systems of the invention having varied amounts of thermoplast up to 35 wt %. Toughness was found to increase at a greater rate above 15 wt % thermoplast and this suggests a reaction effect is taking place with the catalyst in addition to the expected increase by virtue of the additional toughening thermoplast. At this level toughening was also found to be superior to that in conventional high temperature cure systems.

EXAMPLE 3.2.2

Neat Resin Morphology (Transmission Electron Microscopy)—TEM

Annex 6 contains the TEM micrographs for all of the formulations detailed in Table VII. Observing X99+0.5 BF3(mea). X99+0.5 BF3(dma) and BF3(pip) it can be seen that a co-continuos morphology exists in all three samples.

EXAMPLE 3.2.3

FTIR

Samples were prepared as detailed under Example 2 and then characterised using FTIR to determine the level of epoxy remaining and the amount of ether produced as a function of time the results of which can be seen in the following Table's.

TABLE VIII

X99 + 0.5 BF3 (dma) (Cured for x hours at 85 C.)

| Time at 85° C. | Ether/Aromatic Ratio | Epoxy/Aromatic Ratio | % Epoxy Remaining |
|---|---|---|---|
| 0 | 0.38 | 1.28 | 100 |
| 1 | 1.49 | 0.87 | 70 |
| 2 | 1.36 | 0.9 | 72 |
| 3 | 1.95 | 0.83 | 66 |
| 4 | 1.98 | 0.75 | 60 |
| 5 | 2.37 | 0.74 | 59 |
| 6 | 2.05 | 0.76 | 61 |
| 8 | 2.41 | 0.69 | 55 |
| 10 | 2.84 | 0.63 | 50 |
| 12 | 3 | 0.63 | 50 |
| 14 | 3.3 | 0.53 | 42 |
| 16 | 3 | 0.55 | 44 |
| 18 | 3.1 | 0.55 | 44 |

TABLE IX

X99 + 0.5 BF3 (bea) (Cured for x hours at 85 C.)

| Time at 85° C. | Ether/Aromatic Ratio | Epoxy/Aromatic Ratio | % Epoxy Remaining |
|---|---|---|---|
| 0 | 0.64 | 1.02 | 100 |
| 1 | 1.49 | 0.91 | 89 |
| 2 | 1.37 | 0.71 | 69 |
| 3 | 2.16 | 0.70 | 68 |
| 4 | 2.45 | 0.68 | 67 |
| 5 | 2.48 | 0.71 | 69 |
| 6 | 2.51 | 0.68 | 67 |
| 8 | 2.64 | 0.62 | 61 |
| 10 | 2.71 | 0.53 | 52 |
| 12 | 2.84 | 0.45 | 44 |
| 14 | 2.8 | 0.46 | 45 |
| 16 | 3.23 | 0.46 | 45 |
| 18 | 3.47 | 0.46 | 45 |

EXAMPLE 3.2.4

Pre-cured and Post Cured Tg's

Samples for the determination of Tg were prepared as described in 2.1 and were determined using either DSC or Tortional Rheometry, depending upon the physical nature of the specimen.

Figure VII represents the pre-cured Tg's of the Boron Triflouride catalysts used to cure X99. The Tg's are represented as a function of pre-cure time in hours As can be seen from Figure VII, after about 12 hours all the BF3 based catalysts produce pre-cured Tg's above 60° C.

Figure VIII represents the post cured Tg's of the materials described in Figure VII. As can be seen from that Figure, upon post cure all of the BF3 systems produce Tg's above 170° C.

Comparative Example 3.3

Preparation of Compositions
X99 cured with Curamid CN (Imidazole)

EXAMPLE 3.3.1

Neat Resin Mechanical Properties

Using the procedure of Example 2 fully cured panels were assessed using the tests outlined in Example 3.1.1;

Table X, details the results of the neat resin mechanical assessment and also includes the results of Example 3.1.1 and of a conventionally high temperature cured system.

TABLE X

| Material | Fracture Toughness | Fracture Strength | Tensile Yield Strength | Ductility Factor | Modulus |
|---|---|---|---|---|---|
| X99* | 0.67 | 1.34 | 127 | 0.11 | 3.1 |
| X99** | 0.29 | 1.09 | 117 | 0.06 | 3.0 |
| X99 + 0.5 BF3 (mea)** | 0.77 | 1.77 | 135 | 0.18 | 3.5 |
| X99+ 0.5 Curamid CN** | 0.4 | 1.37 | 116 | 0.14 | 3.0 |

\* Cured For 3 hours at 175 C. (20% Amine ended KM180)
\*\*Cured For 18 hours at 85 C. and post cured for 2 hours at 175 C. (20% Amine ended KM180).

The results from the above table show that the addition of the Curamid CN leads to an improvement in the toughness of the LTC X99 system but is still only half that of the X99 system cured with 0.5 BF3(mea).

3.3.2 Morphology of X99 cured with Curamid CN.

The TEM micrograph in Annex 7 clearly show that there is visible sign of a two phase system using this particular technique which is different to that observed for the X99 system cured with anyone of the BF3 Lewis acids described.

EXAMPLE 3.3.3
FTIR

Sample were prepared as detailed under Example 2 and then characterised using FTIR to determine the level of epoxy remaining and the amount of ether produced as a function of time the results of which can be seen in the following Table's.

TABLE XI

X99 + 0.5 Curamid CN (Cured for x hours at 85 C.)

| Time at 85° C. | Ether/Aromatic Ratio | Epoxy/Aromatic Ratio | % Epoxy Remaining |
|---|---|---|---|
| 0 | 0.52 | 0.98 | 100 |
| 1 | 1.2 | 0.83 | 85 |
| 2 | 2.76 | 0.84 | 86 |
| 3 | 2.63 | 0.77 | 78 |
| 4 | 3.13 | 0.75 | 77 |
| 5 | 3.34 | 0.64 | 66 |
| 6 | 4.43 | 0.51 | 52 |
| 8 | 5.61 | 0.49 | 50 |
| 10 | 6.7 | 0.49 | 50 |
| 12 | 6.7 | 0.46 | 47 |
| 14 | 6.8 | 0.42 | 42 |
| 16 | 6.9 | 0.42 | 42 |
| 18 | 7 | 0.42 | 42 |

TABLE XII

X99 + 1.0 Curamid CN (Cured for x hours at 85 C.)

| Time at 85° C. | Ether/Aromatic Ratio | Epoxy/Aromatic Ratio | % Epoxy Remaining |
|---|---|---|---|
| 0 | 0.72 | 1.2 | 100 |
| 1 | 2.66 | 0.84 | 70 |
| 2 | 3.95 | 0.71 | 59 |
| 3 | 4.91 | 0.69 | 58 |
| 4 | 5.16 | 0.43 | 36 |
| 5 | 5.26 | 0.42 | 35 |
| 6 | 5.73 | 0.37 | 31 |
| 8 | 6.3 | 0.37 | 31 |
| 10 | 6.5 | 0.37 | 31 |
| 12 | 6.7 | 0.36 | 30 |
| 14 | 6.9 | 0.35 | 29 |
| 16 | 7 | 0.33 | 27 |
| 18 | 7.2 | 0.31 | 26 |

The immediate difference between the data in the two tables above compared to the data in Table's II, III, VIII and IX (X99 cured with BF3 based catalyst's ) is the level of ether which is produced. This is almost double in the Curamid system. The appearance of large amounts of ether suggests that the epoxy moieties have reacted with each other. This leads to a highly crosslinked network.

Figure IX and X show the level of consumption of epoxide and the level of ether generated from the data in Tables XI and XII respectively.

Figure X shows results for the consumption of epoxide as a function of time at 85 C.

Figure X shows results for the generation of ether as a function of time at 85 C.

EXAMPLE 3.3.4
Pre-cured and Post Cured Tg's

Samples for the determination of Tg were prepared as described in 2.3 and were determined using either DSC or Tortional Rheometry, depending upon the physical nature of the specimen.

TABLE XIII represents the precured Tg's for the X99 system cured with 0.5 and 1.0 pbw of Curamid CN.

| Time of pre-cure at 85 C. | X99 + 0.5 Curamid CN (Tg) | X99 + 1.0 Curamid CN (Tg) |
|---|---|---|
| 0 | −27 | −27 |
| 4 | 50 | 43 |
| 6 | 51 | 45 |
| 8 | 50 | 43 |
| 10 | 52 | 45 |
| 12 | 51 | 42 |
| 14 | 50 | 41 |
| 18 | 52 | 43 |

TABLE XIV represents the post cured Tg's for the X99 system cured with 0.5 and 1.0 pbw of Curamid CN.

| Time of pre-cure at 85 C. | X99 + 0.5 Curamid CN (Tg) | X99 + 1.0 Curamid CN (Tg) |
|---|---|---|
| 0 | 149 | 153 |
| 4 | 150 | 149 |
| 6 | 151 | 148 |
| 8 | 149 | 150 |
| 10 | 150 | 148 |
| 12 | 148 | 150 |
| 14 | 152 | 149 |
| 18 | 150 | 151 |

As can be seen from the two tables above that both levels of Curamid CN produce pre-cured Tg's above 30 C. However their post cured Tg's do not rise above 160 C. The possible reason for this is that the Imidazoles react via etherification reactions i.e. without amine consumption and chain extension and hence produce very tight crosslinked networks. When this occurs under the precure conditions the system quickly becomes very immobile and is virtually 'frozen' from further chemical reactions. As the system post cures this 'frozen' state persists thus preventing only a minimal increase in Tg. This is the complete opposite of what is found in the case of the BF3(mea) were precure results in a Tg above 50 C but with the minimum amount of etherification. Upon postcure it is still relatively mobile and can further react to produce much higher post cured Tg's.

EXAMPLE 3.4

Comparative Example—Alternative catalysts to Curamid CN.

A number of Imidazole and Urea based low temperature catalysts were compared to see if they behaved like the Curamid CN or like the boron Triflouride catalysts.

The catalysts chosen were;

The alternative catalysts were initially examined by FTIR to establish the rate of consumption of epoxide and the generation of ether.

The FTIR indicated that all of the Urea based catalysts behave exactly the same as the Imidazole catalysts in that they react very quickly at low temperatures to consume epoxide but their mechanism in doing so is to generate etherification. This leads to a highly crosslinked network, under pre-cure conditions, and results in a poor translation of high Tg during postcure. These comments are confirmed from the following set of data derived from the curing of X99 with the above alternative Urea based catalysts.

Pre-cured Tg's of X99 system cured with Diuron, Chlorotoluron, Fenuron and CA150.

Figure XI shows results for pre-cured Tg's as a function of time at 85 C.

Similarly, Figure XII shows results for postcured Tg's of the above pre-cured systems.

EXAMPLE 4

Preparation of Resin for Hot Melt Impregnation

Epoxy resins MY0510 and Rutapox 0158 were mixed together and heated. When the resin temperature reached 100–110° C. slow portion wise addition of thermoplastic polymer of Example 2 was commenced, with good agitation to prevent formation of lumps. Heating of the mixture was continued to 130–135° C. with stirring until all the polymer was dissolved, for approximately 30–45 minutes. The mixture was then cooled to 75° C. and the LTC catalyst, $BF_3$.mea was added in portions with efficient stirring. Mixing was continued for a few minutes until the catalyst was dissolved. Pre-sieved 3,3'-DDS was added in portions with mixing for 5–10 minutes until the resin was homogenous. The resin was drained from the mixture, cooled immediately on chill plates and placed in a freezer at −18° C.

The epoxy resin precursors included 0.05% of a silicon oil de-foamer/air release agent such as Foamkill.

The resin was suited for hot melt impregnation to form composites which were tested and found to show equivalent or superior properties to those using conventional catalysts.

What is claimed is:

1. Method for the preparation and curing of a curable composition or prepreg comprising at least one polyaromatic having reactive end groups, at least one thermoset resin, and a reactive catalyst, wherein the catalyst comprises a Lewis acid having amine functionality which co-ordinates the reactive end groups of the polyaromatic with the thermoset resin at a pre-cure temperature in the region 60–150° C., and wherein the at least one polyaromatic comprises at least one polyaryl sulphone comprising ether-linked repeating units, optionally additionally comprising thioether-linked repeating units, the units being selected from the group consisting of —$(PhSO_2Ph)_n$— and

—$(Ph)_a$— wherein Ph is phenylene, n=1 to 2, a=1 to 3 and when a exceeds 1, said phenylene are linked linearly through a single chemical bond or divalent group other than —$SO_2$— or are fused together, characterized in that the process comprises admixing the respective polyaromatic and thermoset components as hereinbefore defined, optionally in the presence of solvent, removing residual solvent by evaporation at 50–200° C., precuring in a first stage by subjecting the curable composition to a first lower temperature state in the range of 60–150° C. and in the presence of a $BF_3$ catalyst, and then subjecting said curable composition or prepreg to elevated temperature in the range of 60–200° C., with the use of elevated pressure of up to 10 bar to restrain deforming effects of escaping gases or to restrain void formation.

2. Method as claimed in claim 1 comprising additionally post-curing in a second stage by subjecting the precured composition to a temperature in the range of 150° C. to 200° C. at atmospheric pressure, to improve the glass transition temperature of the product.

3. Method as claimed in claim 2 wherein said post curing is carried out without use of an autoclave or of moulds or tools.

4. Pre-cured composition or pre-preg comprising a chain extended polyaromatic in which reactive end groups are coordinated with a thermoset having number average molecular weight in the range 3,000–30,000, an amount of unreacted thermoset and a catalyst wherein the cured composition has a glass transition temperature in the range 50–70° C. and wherein the unreacted thermoset is present in an amount of up to 50 parts by weight made by the process of admixing a polyaromatic, wherein the polyaromatic comprises at least one polyaryl sulphone comprising ether-linked repeating units, optionally additionally comprising thioether-linked repeating units, the units being selected from the group consisting of —$(PhSO_2Ph)_n$— and

—$(Ph)_a$— wherein Ph is phenylene, n=1 to 2, a=1 to 3 and when a exceeds 1, said phenylene are linked linearly through a single chemical bond or divalent group other than —$SO_2$— or are fused together, and thermoset components, optionally in the presence of solvent, removing residual solvent by evaporation at 50–200° C., precuring in a first stage by subjecting the curable composition to a first lower temperature state in the range of 60–150° C., and then subjecting said curable composition or prepreg to elevated temperature in the range of 60–200° C., with the use of elevated pressure of up to 10 bar to restrain deforming effects of escaping gases or to restrain void formation.

* * * * *